United States Patent [19]

Ooiwa et al.

[11] 4,008,607
[45] Feb. 22, 1977

[54] FUEL CONSUMPTION RATE DETECTING APPARATUS

[75] Inventors: Katsuhiko Ooiwa, Handa; Shigehiko Ito, Aichi; Shinichi Maeda, Kariya, all of Japan

[73] Assignee: Nippondenso Co., Ltd., Kariya, Japan

[22] Filed: June 30, 1975

[21] Appl. No.: 592,203

[30] Foreign Application Priority Data

July 15, 1974 Japan .............................. 49-81276

[52] U.S. Cl. ................................................. 73/114
[51] Int. Cl.² ...................................... G01M 15/00
[58] Field of Search ............................. 73/114, 115; 235/150.21, 194

[56] References Cited

UNITED STATES PATENTS

| | | | |
|---|---|---|---|
| 3,118,302 | 1/1964 | Fathauer | 73/114 |
| 3,466,460 | 9/1969 | Connoly | 235/194 |
| 3,545,265 | 12/1970 | McIlraith et al. | 73/136 |
| 3,616,687 | 11/1971 | Wignall | 73/136 |
| 3,812,710 | 5/1974 | Bauman et al. | 73/114 |

*Primary Examiner*—Herbert Goldstein
*Attorney, Agent, or Firm*—Cushman, Darby & Cushman

[57] ABSTRACT

A fuel consumption rate detecting apparatus comprises a circuit for representing fuel consumption amount per unit time, a pulse generator for generating a pulse signal whose pulse width is inversely proportional to the fuel consumption and whose frequency is inversely proportional to the vehicle speed, and meter circuit for measuring the mean value of the pulse signal, which is, in turn, proportional to the fuel consumption rate.

7 Claims, 7 Drawing Figures

FUEL CONSUMPTION RATE DETECTING APPARATUS

BACKGROUND OF THE INVENTION

This invention relates to an apparatus for detecting fuel consumption rate of a vehicle in the form of, for example, Km/l, which continuously informs a driver of current fuel consumption rate thereby leading him to accomplish the most economic drive of the vehicle.

SUMMARY OF THE INVENTION

It is a primary object of the present invention to provide a new apparatus for indicating the fuel consumption rate in the form of the ratio of the running distance of the vehicle and the amount of the fuel consumed in such running.

It is another object of the present invention to provide an apparatus for detecting the fuel consumption rate which is available not only to a vehicle equipped with an electronically controlled fuel injection system but also the vehicle without such fuel injection system.

It is a further object of the present invention to provide an apparatus for detecting fuel consumption rate of a vehicle in which an amount of fuel consumed in a unit time is detected, a pulse signal of the frequency proportional to the vehicle speed and of the pulse width inversely proportional to the amount of fuel consumed in a unit time is generated, and the mean value of said pulse signal is obtained in the form of the ratio of the running distance of the vehicle (Km) and the amount of the fuel consumed (liter) in such running.

DESCRIPTION OF THE PREFERRED EMBODIMENT

Figure 1:
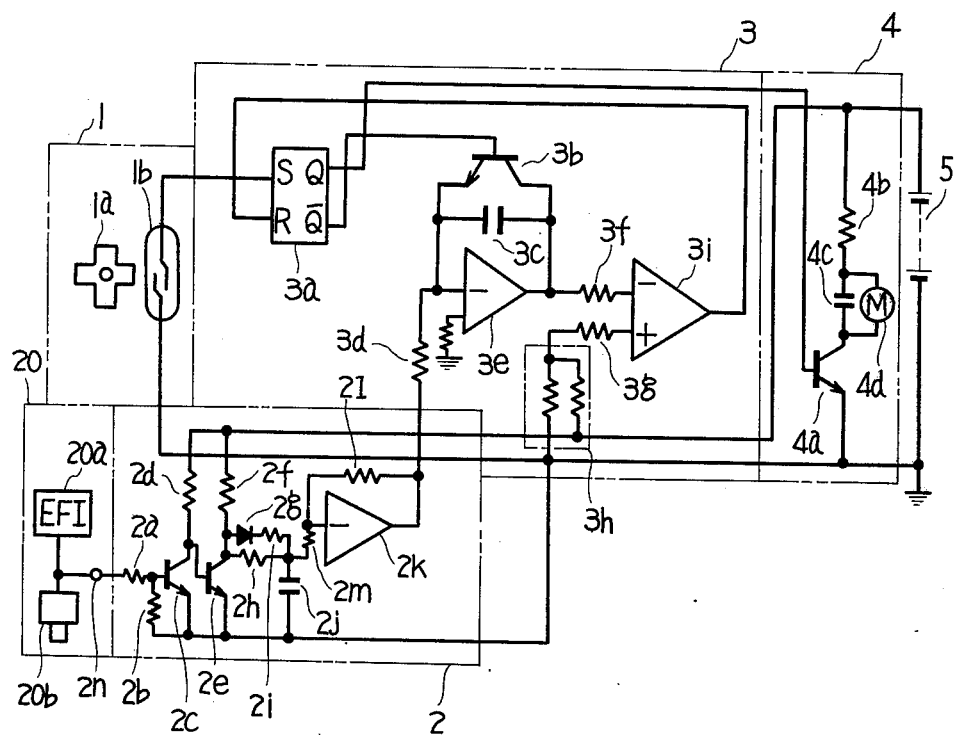
FIG. 1 is the circuit diagram of a first embodiment according to the present invention.
Figure 2:
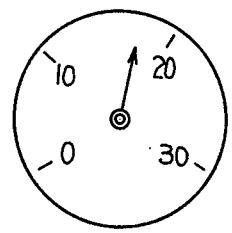
FIG. 2 is a front view of the indicator shown in FIG. 1, FIGS. 3 and 4 are graphs showing characteristic curves of the computing circuit in FIG. 1, FIG. 5 (a), (b), (c), (d) and (e) show respective voltage characteristic curves on the specific portions of the circuit shown in FIG. 1.

In FIG. 1, a vehicle speed detector 1 generates a speed pulse signal of the frequency proportional to vehicle speed, which, for example, is incorporated into a speed meter. The vehicle speed detector 1 comprises a magnet $1a$ carried on a speed meter cable and a reed switch $1b$ disposed in the vicinity of the rotating locus of the magnet $1a$. The magnet $1a$ and the reed switch $1b$ are so constructed that the reed switch opens and closes four times each turn. When the vehicle speed is 60 Km/H, for example, it opens and closes 637 × 4 times in a minute. A computing circuit 2 computes the fuel consumption speed from injection pulses applied on an electromagnetic valve $20b$ by a controlling circuit $20a$ of an electronically controlled fuel injection system which is well known. The computing circuit 2 comprises bias resistors $2a$ and $2b$, an input transistor $2c$, its collector resistor $2d$, an inverting transistor $2e$, its collector resistor $2f$, a diode $2g$, a charging and discharging transistor $2h$, a charging resistor $2i$, a capacitor $2j$, an operational amplifier $2k$ and resistors $2l$ and $2m$ for defining an amplitude of the operational amplifier $2k$. When the transistor $2e$ is made nonconductive, the capacitor is charged through the resistor $2f$, diode $2g$ and resistor $2i$ and, at the same time, through the resistors $2h$. When the transistor $2e$ is made conductive, on the other hand, the capacitor $2j$ is discharged through the resistor $2h$ and the transistor $2e$. The electromagnetic valve $20b$ is opened only during the high level of the injection pulse to inject fuel in proportion to the duration of the high level pulse. An operation circuit 3 provides, in synchronism with the speed pulse signal, a pulse signal which is inversely proportional to the fuel consumption speed. The operation circuit 3 comprises a R-S flip-flop circuit $3a$, a transistor $3b$, a capacitor $3c$, a resistor $3d$, an operational amplifier $3e$, input resistors $3f$ and $3g$, a voltage dividing resistor $3h$ and a comparator $3i$. The R-S flip-flop circuit is operated in response to the vehicle speed pulse signal. When the flip-flop circuit is set, the transistor $3b$ is made nonconductive. The operational amplifier $3c$ forms an integration circuit in combination with the capacitor $3c$. The comparator $3i$ generates a comparison signal which becomes low and, in turn, resets the R-S flip-flop circuit when the output voltage of the integration circuit exceeds a predetermined voltage. The duration in which the flip-flop circuit is kept set by one of the vehicle speed pulses until it is reset by the succeeding comparison signal is so determined that the flip-flop circuit has been reset by the time when the next one of the vehicle speed pulses is applied to the flip-flop circuit $3a$. A meter circuit 4 measures the mean value of the pulse signal current which is an output signal of the R-S flip-flop circuit $3a$. The meter circuit 4 comprises an output transistor $4a$, a current limiting resistor $4b$, a smoothing capacitor $4c$, an indicator for indicating the fuel consumption rate $4d$. The indicator $4d$ which is of a moving coil type as shown in FIG. 2 indicates the mean current flowing through the current limiting resistor $4b$. Connected to the meter circuit 4 is a battery 5, which is generally regulated at a constant voltage.

In operation, when an engine of a vehicle starts, the electronically controlled fuel injection system 20 generates an injection pulse signal in synchronism with the rotation of the engine and drives the electromagnetic valve $20b$ to open, which, in turn, supplies fuel to the engine under a constant pressure. The injection pulse signal is further applied to the computer circuit 2 at the terminal $2n$ to effect the input transistor $2c$ and the inverting transistor $2e$ to thereby charge and discharge the capacitor $2j$. When the terminal $2n$ is brought to the high level by the injecting pulse signal, the input transistor $2c$ is made conductive and the inverting transistor $2e$ is made nonconductive, whereby the capacitor $2j$ is charged through the resistor $2f$, the diode $2g$ and the resistor $2i$ and in parallel therewith the resistor $2h$.

Figure 3:
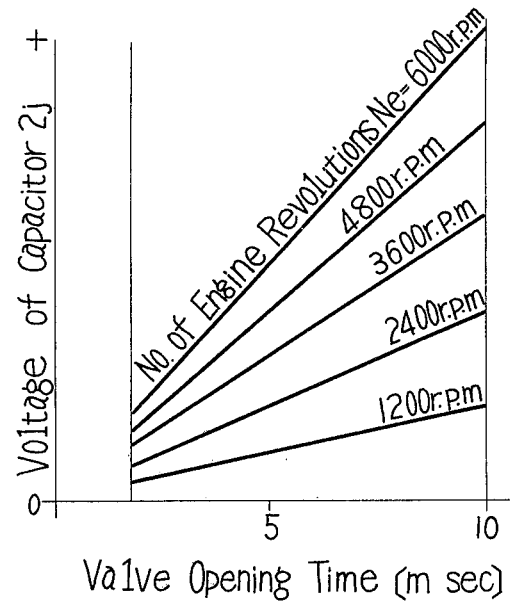
Figure 4:
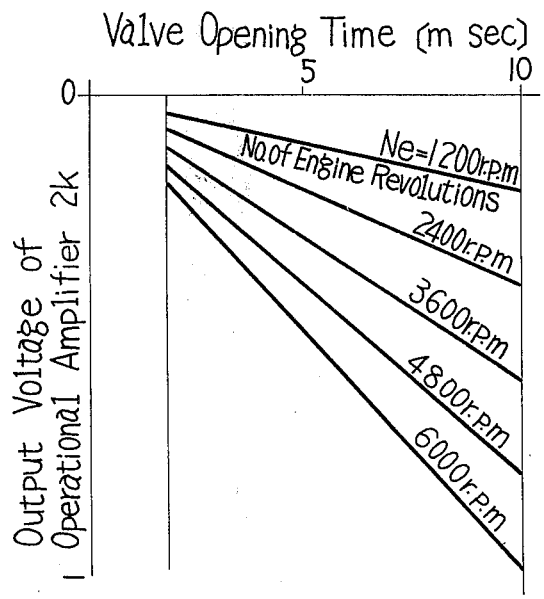

When, on the other hand, the input terminal $2n$ is brought to the low level, the input transistor $2c$ is made nonconductive and the inverting transistor $2e$ is made conductive, whereby the capacitor $2j$ is discharged through the resistor $2h$ and the transistor $2e$. The mean value of the capacitor voltage varies with the rotation of the engine and, also, the valve opening period, as shown in FIG. 3. From the figure, it is apparent that the mean value of the capacitor voltage is proportional to the product of the valve opening period and the engine rotation, which represents fuel consumption speed. The capacitor voltage is then inverted by the inverting amplifier comprising the operational amplifier 2k, the negative resistor 2l and the input resistor 2m to get a negative voltage which is proportional to the product of the valve opening period and the number of the engine rotation as shown in FIG. 4.

Figure 5:
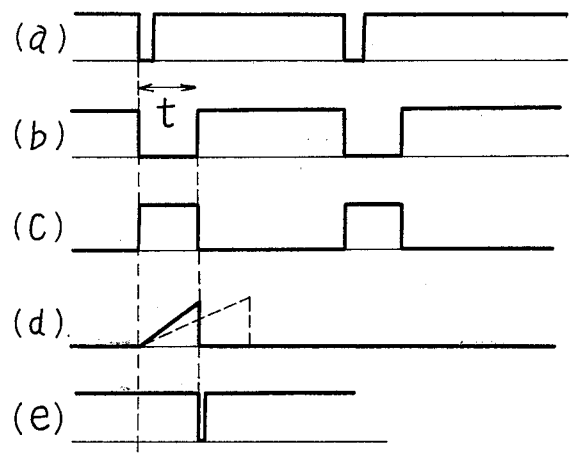

In the case the vehicle is running, the vehicle speed pulse signal shown in FIG. 5 (a) whose frequency is proportional to the vehicle speed is applied to the R-S flip-flop circuit 3a, which is set to generate the low level voltage at its $\overline{Q}$ output terminal as shown in FIG. 5 (b). The low level voltage of the $\overline{Q}$ output terminal, in turn, renders the transistor 3b nonconductive to cause the integrator comprising the capacitor 3c, resistor 3d and operational amplifier 3e to integrate the output signal of the computer circuit 2. As shown in FIG. 5 (d), the integrated signal voltage increases with a gradient proportional to the fuel consumption speed which corresponds to the output voltage of the computer circuit. When the integrated signal voltage exceeds a predetermined voltage defined by the comparator 3i, a low level comparison signal shown in FIG. 5 (e) appears to thereby reset the flip-flop circuit 3a. Consequently, the voltage of the $\overline{Q}$ output terminal becomes high to thereby render the transistor 3b conductive and the capacitor 3c discharges in an instant. Thus, the output of the comparator 3i returns to the high level, which resets the R-S flip-flop 3a to the original state. Since the Q output terminal of the R-S flip-flop circuit 3a maintains the high level during the period from when it is set until it is reset as shown in FIG. 5 (c), the time duration of the output pulse is inversely proportional to the fuel consumption speed.

Figure 6:
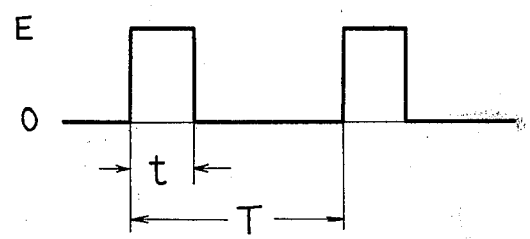
FIG. 6 is a voltage characteristic curve of the pulse signal flowing through indicator shown in FIG. 1.

The output pulse signal which is generated by the operation circuit 3 at the terminal Q of the flip-flop circuit every time the vehicle speed pulse signal is applied thereto is applied to the meter circuit 4 in which the output transistor 4a switches on and off according to the output pulse signal of the operation circuit 3 the current flowing through the ampere meter 4d in the manner shown in FIG. 6.

When one cycle of the applied output pulse is assumed T (sec.), its pulse width is t (sec.), the resistance of the current limiting resistor is R ($\Omega$), the internal resistance of the amperemeter is r ($\Omega$) and the battery voltage is E (V), then the mean value of the current $\overline{I}$ is expressed as follows:

$$\overline{I} = E\ (t/T) \cdot (1/R+n) \tag{1}$$

When the vehicle speed is assumed Vs (Km/H), then the cycle time T is expressed as follows:

$$T = kl\ (1/Vs) \tag{2}$$

where $kl$ is a constant.

When the fuel consumption speed is assumed Vf (L/H), then the aforementioned pulse width $t$ is expressed as follows:

$$t = k2\ (1/Vf) \tag{3}$$

where $k2$ is another constant.

In the above expression (1), if another constant $k3$ is substituted for E $(1/R+n)$ and the expression (2) and (3) are substituted for $(t/T)$, then the mean value of the current $\overline{I}$ is expressed as follows:

$$\overline{I} = k3\ (t/T) = k3\ (k2/k1) \cdot (Vs/Vf) = K\ (Vs/Vf) \tag{4}$$

From the above expression (4), it is apparent that $\overline{I}$ is proportional to the fuel consumption rate (Km/l).

Connected in parallel with the ampere meter 4d is a capacitor 4c for preventing oscillation of the ampere meter 4d in the lower speed range where $T >> t$.

Figure 7:
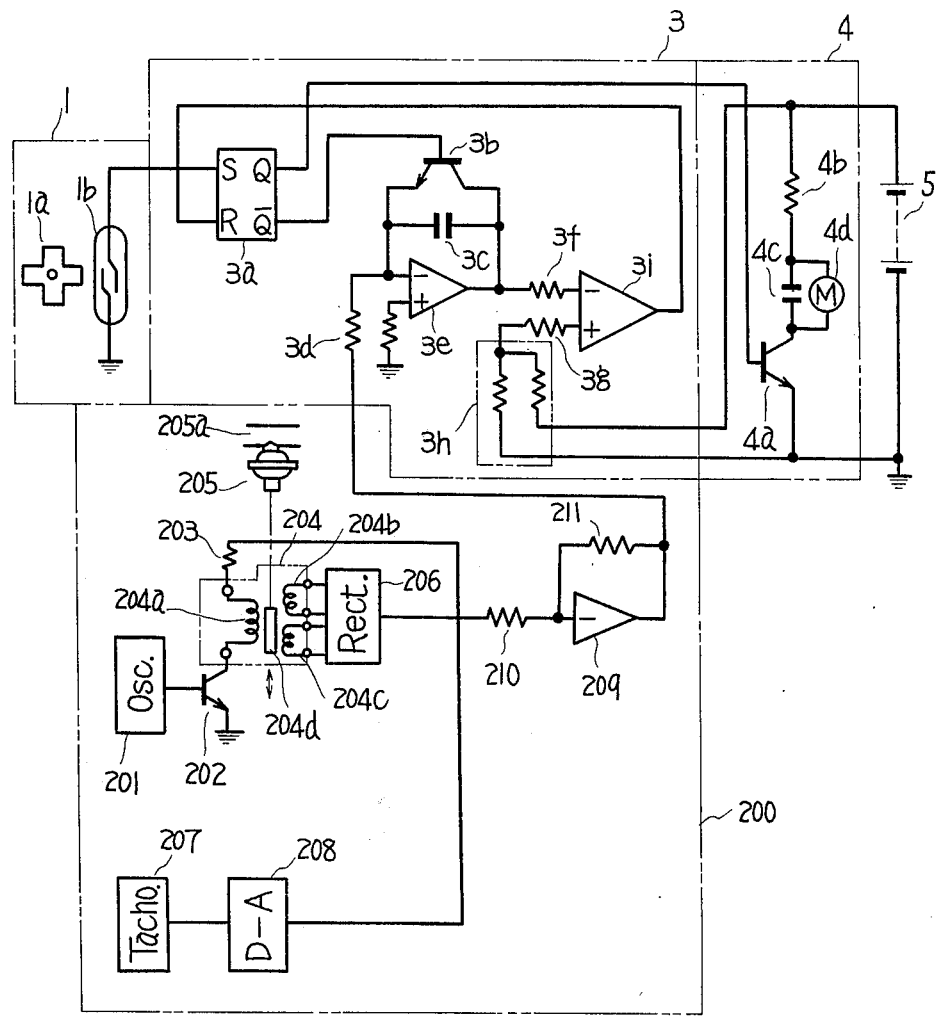
FIG. 7 shows the circuit diagram of a second embodiment of the present invention.

In FIG. 7, there is shown another embodiment according to the present invention, which is used for a vehicle equipped with no electronically controlled fuel injection system.

In this embodiment, a detecting circuit 200 is substituted for the computing circuit 2 of the first embodiment. The detecting circuit 200 comprises a conventional oscillating circuit 201 for generating a signal of a predetermined frequency, a transistor 202, a current limiting resistor 203, a differential transformer 204, and a suction vacuum detector 205. The differential transformer 204 is composed of a primary coil 204a, secondary coils 204b and 204c, and a magnetic core 204d. The suction vacuum detector 205 is provided with a bellows for converting suction vacuum into mechanical motion to effect the movement of the magnetic core 204d, whereby the differential transformer 204 generates an electric signal responsive to the movement of the magnetic core 204d. A rectifying circuit 206, which is of the well known construction, rectifies both the output voltages of the secondary coils 204b and 204c. A tachometer 207 which is also well known detects the rotation of the engine and generates a rotational signal of the frequency proportional to the engine rotation. A conventional D-A converter 208 converts in the well known manner the rotational signal into a voltage proportional to the engine rotation, which is applied on a bias resistor 203. An operational amplifier 209, with resistors 210 and 211, inverts the output of the rectifying circuit 206 which corresponds to the product of the suction vacuum and the engine rotation, which is generally known, is proportional to the fuel consumption speed.

In operation, the oscillating circuit 201 generates a oscillation signal, which makes the transistor 202 turn on and off. As a result, the primary coil 204a of the differential transformer 204 is energized and deenergized correspondingly, thereby generating voltages responsive to the mechanical motion of the moving core 204d on both the secondary coils 204b and 204c. Those voltages are rectified and smoothed by the rectifying circuit 206 to obtain a direct current signal corresponding to the suction vacuum. If the voltage applied on the resistor 203 is unchanged, the direct current signal becomes proportional to the suction vacuum. However, since the voltage applied to the bias resistor 203 is the output voltage of the D-A converter 208, the direct current voltage of the rectifying circuit 206 is proportional to the product of the engine revolution and the suction vacuum. The polarity of the output of the rectifying circuit 206 is then inverted by the operational amplifier 209 with the resistor 210 and 211 in the same manner as the first embodiment.

What is claimed is:

1. A fuel consumption rate detecting apparatus for a vehicle having an engine comprising:
    means for generating a direct current voltage representing an amount of fuel consumption per unit time;

means for generating a first pulse signal whose frequency is proportional to the vehicle speed;

means, connected to the above two means, for generating, in synchronism with said first pulse signal, a second pulse signal whose pulse width is inversely proportional to said amount of fuel consumption per unit time;

means, connected to said second pulse signal generating means, for sensing the mean value of said second pulse signal; and means, connected to last said means, for indicating said mean value representing a vehicle running distance per unit fuel consumption amount.

2. A fuel consumption rate detecting apparatus for a vehicle according to claim 1 in combination with an electronically controlled fuel injection system, wherein said means for generating a direct current voltage comprises a capacitor connected to said fuel injection system to be charged when the fuel injection signal is generated from said fuel injection system and discharged when the fuel injection signal is not generated, the mean value of the voltage of said capacitor being proportional to the product of the engine revolution and the injection pulse width of said electronically controlled fuel injection system.

3. A fuel consumption rate detecting apparatus for a vehicle according to claim 1 in combination with an electronically controlled fuel injection system having an electro magnetic valve for injecting fuel into an engine, wherein said means for generating a direct current voltage comprises:

a capacitor;

means, connected to said capacitor and to said fuel injection system, for charging said capacitor when the fuel injection pulse of said fuel injection system is generated and for discharging said capacitor when the fuel injection pulse is not generated; and an inverter, connected to said capacitor, for inverting the voltage across the capacitor.

4. A fuel consumption rate detecting apparatus for a vehicle according to claim 1, wherein said means for representing an amount of fuel consumption per unit time comprises:

an oscillator for generating an oscillating voltage signal of a constant frequency;

means connected to said oscillator for generating a voltage signal proportional to the suction vacuum of the engine and to the rotation of the engine; and an inverter connected to last said means for inverting the voltage signal of last said means.

5. A fuel consumption rate detecting apparatus for a vehicle according to claim 4, wherein last said means comprises:

a transistor having its control gate connected to said oscillator and its emitter-collector circuit;

a differential transformer having a primary coil connected to said emitter-collector circuit at one end, secondary coils and a moving core;

an engine suction vacuum sensor having a moving member movable in response to the engine suction vacuum, said moving member being linked with said moving core, an engine rotation detector, connected to the other end of said primary coil, for generating a d-c voltage signal proportional to the engine rotation;

a rectifying circuit connected to said secondary coils; and an inverter connected to said rectifying circuit.

6. A fuel consumption rate detecting apparatus according to claim 1, wherein said second pulse generating means comprises:

means for generating a constant voltage signal;

an integration circuit, connected to said means for generating a direct current voltage, for integrating a voltage signal indicative of said amount of fuel consumption and generating an integration signal;

a comparator, connected to said constant voltage signal generating means and said integration circuit, for generating a comparison signal when said integration signal exceeds said constant voltage signal; and an R-S flip-flop circuit, connected to said first pulse signal generating means and said mean value sensing means, for controlling said integration circuit in response to said first pulse signal and said comparison signal and generating said second pulse signal.

7. A fuel consumption rate detecting apparatus according to claim 1, wherein said mean value sensing means comprises:

a resistor;

a capacitor to which said indicating means is connected in parallel; and a transistor, connected in series with said resistor and said capacitor, for controlling the current flowing through said resistor in response to said second pulse signal.

* * * * *